United States Patent Office 2,909,267
Patented Oct. 20, 1959

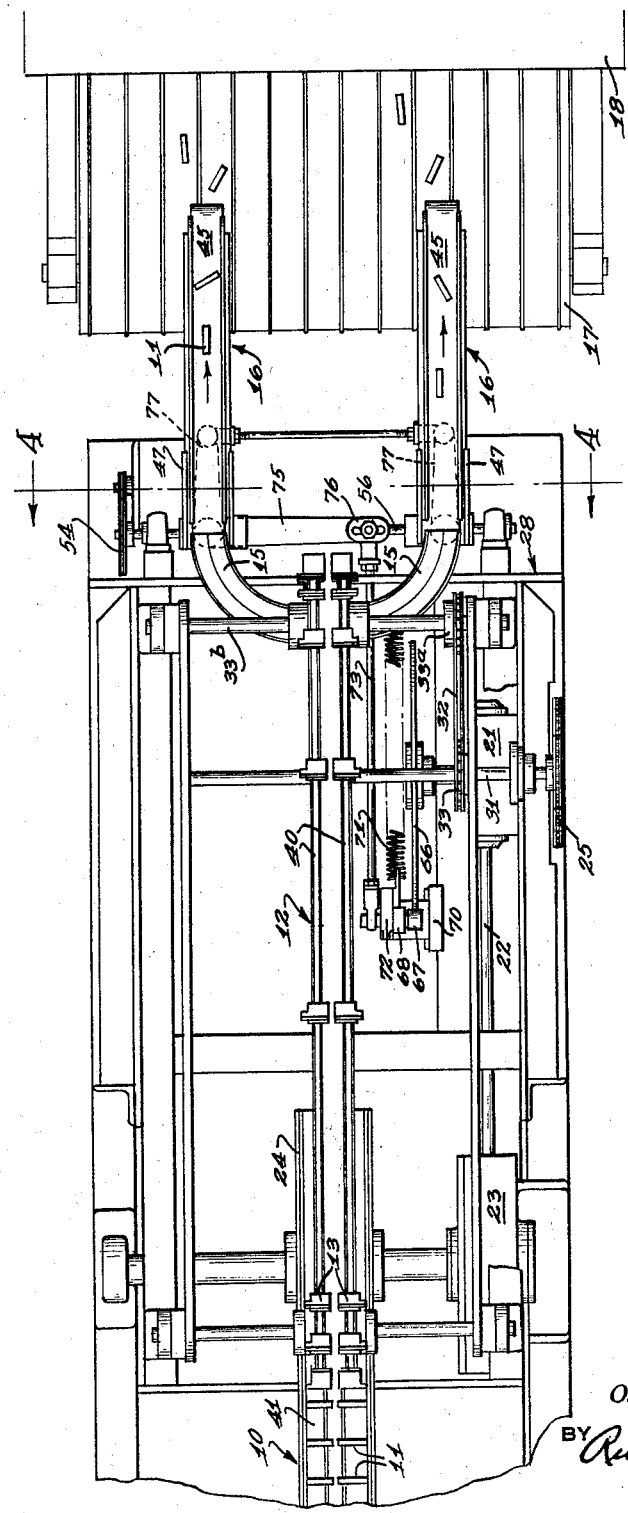

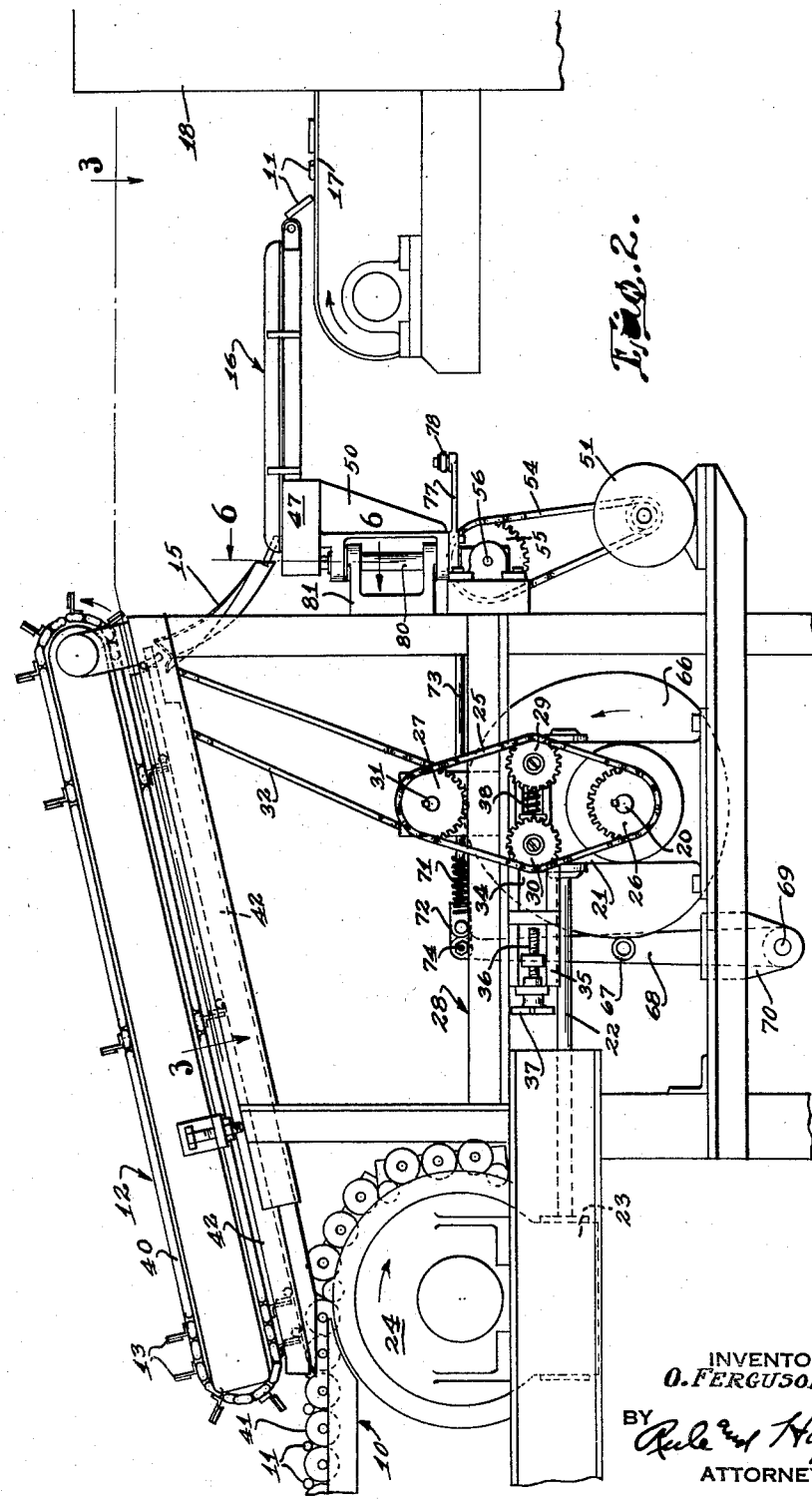

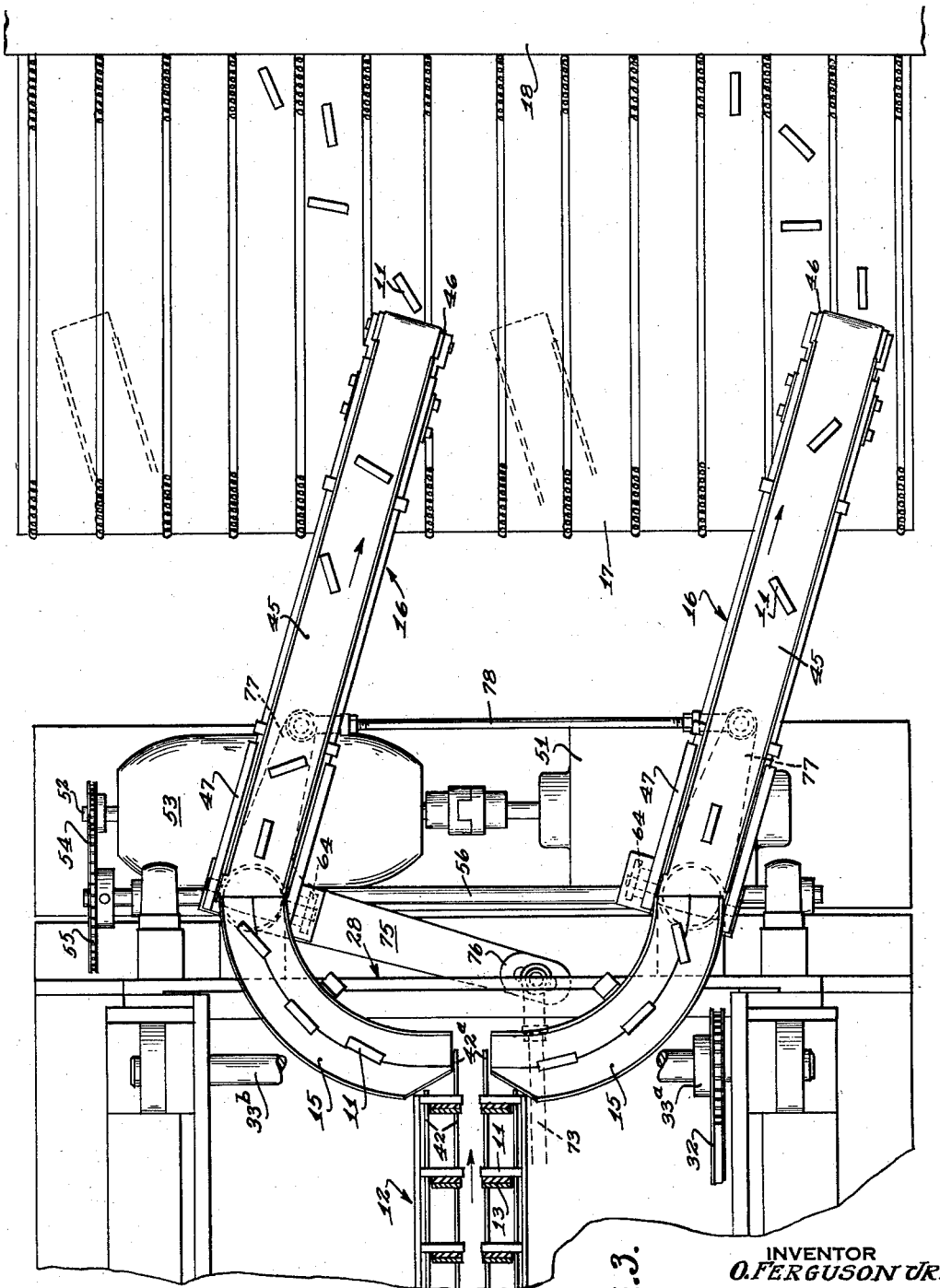

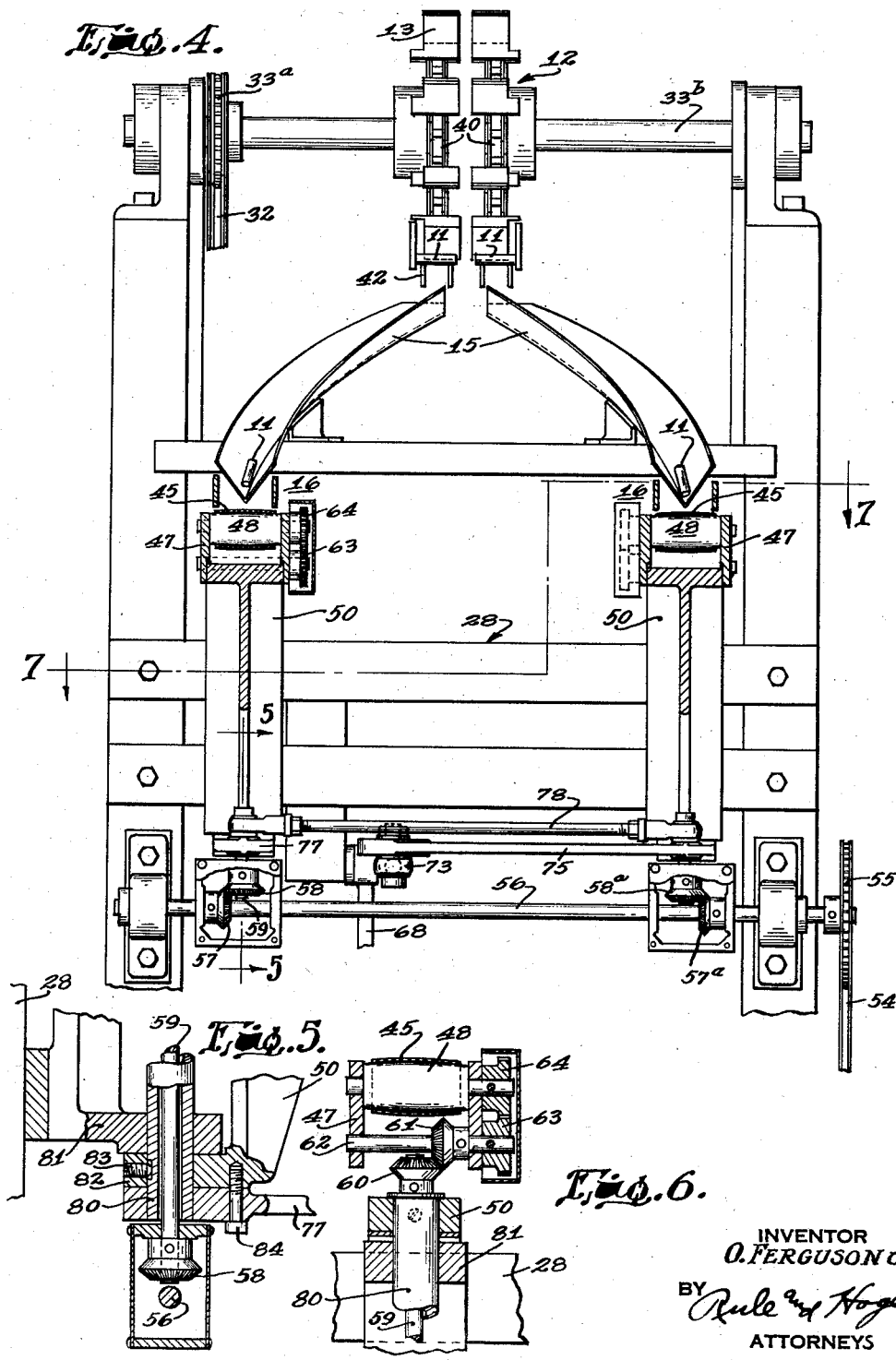

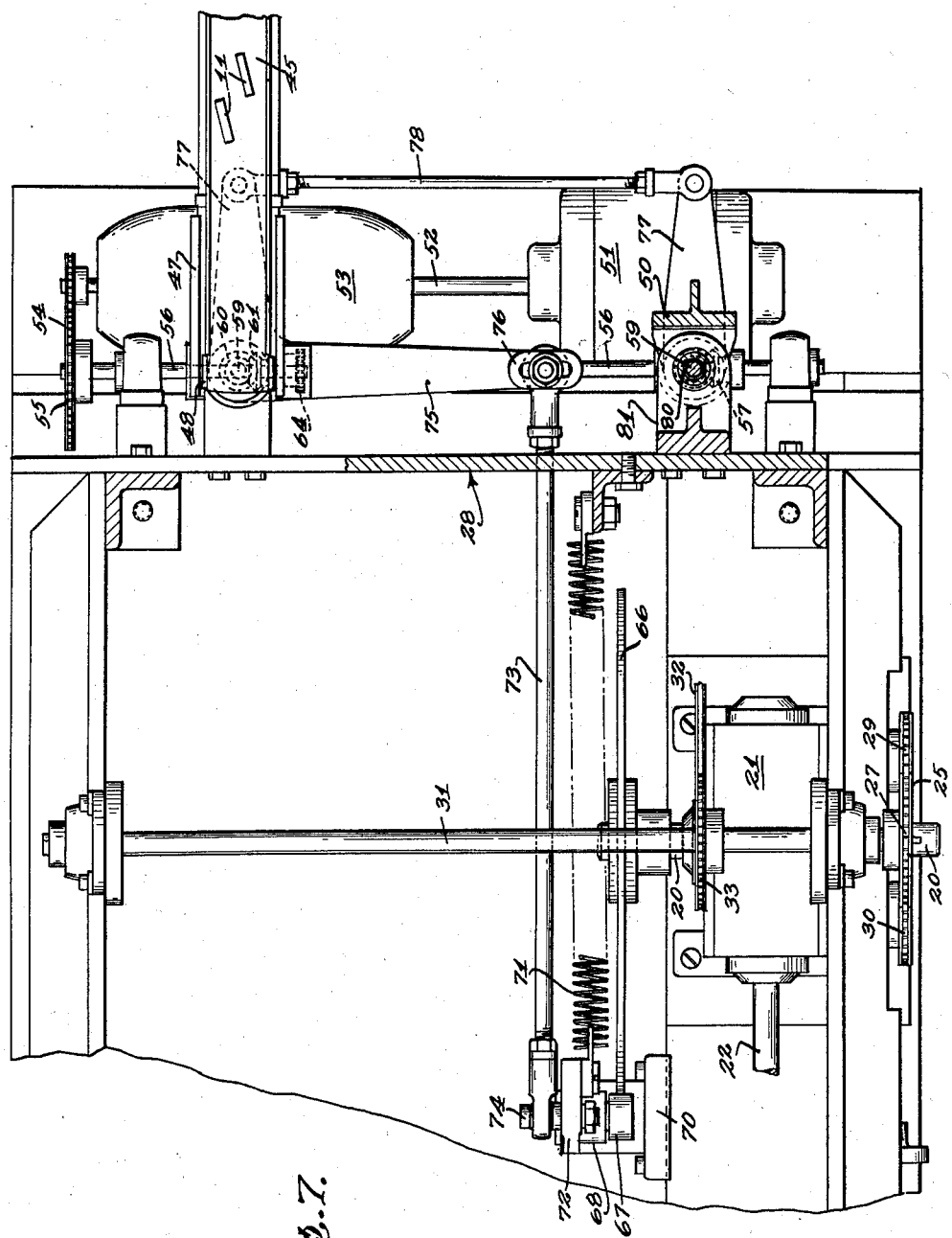

2,909,267

ARTICLE CONVEYING AND DISTRIBUTING APPARATUS

Oscar Ferguson, Jr., Port Norris, N.J., assignor to Owens-Illinois Glass Company, a corporation of Ohio Application December 27, 1955, Serial No. 555,546

3 Claims. (Cl. 198—31)

My invention relates to apparatus for transporting articles from one position to another by a conveyor mechanism and distributing the articles as they are delivered from the conveyor mechanism. The invention in its preferred form provides a pick-up conveyor by which articles are picked up from another conveying apparatus and transferred to chutes which deliver the articles by gravity to discharge conveyors, the latter operating to distribute the articles over a receiving surface.

As herein illustrated and described, the apparatus is adapted and used for receiving glass vials or other articles which have been formed from molten or plastic glass, transferring the articles to an annealing lehr, and distributing them over the lehr conveyor belt by which they are carried through the lehr. The apparatus provides an overhead chain type of pick-up conveyor comprising parallel chains with lugs for picking up the vials and conveying them to a pair of chutes. The chutes are downwardly inclined in divergent directions. The articles are carried by gravity down the chutes which deliver them to a pair of belt discharge conveyors. The discharge conveyors are arranged in parallel relation and convey the articles to a position over the lehr conveyor. Means are provided for oscillating the pair of discharge conveyors horizontally and thereby distributing the articles laterally across the lehr conveyor belt. The overhead pick-up conveyor is driven by the same motor as the conveyor from which the articles are transferred to the pick-up conveyor. The invention provides phase adjusting means for relative adjustment of the conveyors to bring them into proper phase relation.

Referring to the accompanying drawings,

Fig. 1 is a plan view of the apparatus;

Fig. 2 is a side elevational view of the same;

Fig. 3 is a sectional plan view at the line 3—3 on Fig. 2;

Fig. 4 is a sectional elevation substantially at the line 4—4 on Fig. 1;

Fig. 5 is a detail view in section at the line 5—5 on Fig. 4;

Fig. 6 is a detail view in section at the line 6—6 on Fig. 2; and

Fig. 7 is a sectional plan view at the line 7—7 on Fig. 4.

Referring to Figs. 1, 2, and 3, an endless traveling conveyor 10 carries the articles 11 forward to a pick-up conveyor 12. The conveyor 12 is an overhead chain lug type of conveyor carrying lugs 13 which pick up the articles 11 and transfer them to a pair of chutes 15. The articles slide down the chutes to a pair of belt discharge conveyors 16 which extend forwardly over a lehr conveyor belt 17 by which the articles are carried through an annealing lehr 18.

The conveyors 10 and 12 are driven continuously and in synchronism by a motor comprising a main drive shaft 20 (Fig. 2). The motor shaft 20 is connected through gearing in a gear box 21 to a shaft 22 which has driving connection through gearing in a gear box 23 with the driving roll 24 of the conveyor 10. The motor shaft 20 has driving connections with the pick-up conveyor 12 through a train of gearing including a sprocket chain 25 trained over sprocket gears including a gear 26 keyed to the motor shaft, a gear 27 journalled in bearings on the main frame 28, and a pair of intermediate pinions 29, 30. The gear 27 is keyed to a shaft 31 which extends horizontally across the machine frame. A sprocket chain 32 trained over a sprocket gear 33 on the shaft 31, extends upwardly and is trained over a gear 33a on the drive shaft 33b which drives the conveyor 12.

The phase adjustment means for adjusting the phase of the conveyor 12 relative to the conveyor 10 while the conveyors are running, includes the pair of gear pinions 29 and 30. The gear 29 is journalled in a slide bar 34 slidable lengthwise in guideways 35 and adjustable by means of a screw 36 and hand wheel 37. A spring 38, held under compression between the bearings for the pinions 29 and 30, maintains a tension on the sprocket chain 25. Adjustment of the pinion 29 by means of the hand wheel 37 produces a rotative adjustment of the gear 27 relative to the driving gear 26, thereby adjusting the conveyor 12 as may be required to bring the pick-up lugs 13 into proper phase relation to the conveyor 10 and articles 11 thereon. For example, an adjustment of the slide bar 34 to the left (Fig. 2) will shift the pinions 29 and 30 in the same direction thereby shortening the right hand stretch of the chain 25 between the gears 26 and 27 and lengthening the stretch of the chain extending over the pinion 30. This causes a counterclockwise rotation of the gear 27 and counterclockwise movement of the belt conveyor 12.

The conveyor 12 comprises a pair of parallel endless conveyor chains 40 (Fig. 1), each of which has attached thereto lugs 13 spaced at uniform short intervals lengthwise of the chains. The conveyor 10 includes a multiplicity of rolls 41 supporting and spacing the articles 11 to correspond to the spacing of the lugs 13. Each of the conveyor chains 40 is positioned directly over a pair of stationary rails 42 extending lengthwise of the conveyor and providing supports for the articles 11 as they are carried with the chains 40 from the conveyor 10 to the chutes 15. As shown in Fig. 3 the rails 42 are arranged in pairs with the inner rail of each pair extended at 42a to support one end of each article 11 as the other end of the article drops on to the chute 15. The chutes are shaped to turn the articles 11 through an angle of substantially 90° as they travel endwise down the chutes.

Each of the discharge conveyors 16 comprises a continuously traveling endless belt 45 which is trained over an idler roll 46 mounted in the conveyor frame bars 47 at their forward ends and a drive roll 48 at the opposite ends of the bars 47. The conveyor frame bars 47 are bolted to upright frame members 50 which are journalled for oscillation about vertical axes.

The conveyor belts 45 are driven by a motor 51 (Fig. 7) which has driving connection with the belts through a train of gearing including shaft 52, a speed reducing gear change device 53, and sprocket drive chain 54. The chain 54 is trained over a sprocket gear wheel 55 (Fig. 4) keyed to a shaft 56 extending across the machine frame. Keyed to the shaft 56 are miter gears 57 and 57a which run in mesh with gears 58 and 58a respectively. The gear 58 is keyed to the lower end of a vertical shaft 59 (Fig. 5). A miter gear 60 keyed to the upper end of the shaft 59 (Fig. 6) runs in mesh with a gear 61 keyed to a shaft 62 journalled in the conveyor frame bars 47. The shaft 62 has driving connection with the drive roll 48 of the conveyor through a pair of intermeshing gears 63, 64. Driving connections between the shaft 56 and the other discharge conveyor are through gearing substantially the same as that just described.

The means for oscillating the discharge conveyors 16 is as follows: A cam 66 (Fig. 2) is keyed to the drive shaft 20 and operates through a cam follower roll 67 to rock a vertically disposed rock arm 68 about a pivot 69 in a bracket 70 bolted in the main frame. A coil spring 71 is connected at one end by a link 72 to the upper end of the rock arm 68 and at its opposite end to the frame 28 and holds the follower roll 67 on the cam. A rod 73 (Figs. 2 and 7) is connected by a pin 74 to the upper end of the rock arm 68 and extends forwardly therefrom to a horizontal rock arm 75 having a fixed connection with one of the upright frame members 50 which carry the discharge conveyors. The rod 73 has a slot and pin connection 76 with the rock arm 75 permitting adjustment for varying the amplitude of the rocking movement of the discharge conveyors. Parallel rock arms 77, attached to and extending forwardly from the upright frame members 50, are connected by a rod 78 pivoted to the forward ends of the arms, thus providing a parallel link connection by which the two discharge conveyors 16 are caused to oscillate together.

The method of mounting the conveyor frames 50 for oscillating movement is shown in Fig. 5. For this purpose a tubular shaft 80 is mounted for free rotation in a bracket 81 bolted to the framework of the apparatus. The shaft 59 extends through the hollow shaft 80 and is rotatable therein. The frame 50 is formed with a horizontal arm 82 having an opening therein through which the sleeve 80 extends. The arm 82 is keyed to the shaft 80 by a set screw 83. The arm 77 by which the frame 50 is oscillated is connected to said frame by a bolt 84.

Rotation of the cam 66 operates through the linkage described to oscillate the two discharge conveyors 16 horizontally back and forth over the lehr conveyor 17 between the full line and broken line positions (Fig. 3). In this manner the articles 11 are distributed laterally over the lehr conveyor as they are discharged thereon.

Modifications may be resorted to within the spirit and scope of my invention.

I claim:

1. Apparatus for conveying and distributing articles comprising a pick-up conveyor including parallel endless conveyor chains narrowly spaced apart, means for delivering articles to said chains, said chains having lugs spaced at intervals lengthwise thereof in position and operable to engage the articles and advance them to the delivery end of the conveyor, a pair of chutes mounted beneath the said conveyor at the delivery end thereof, each in position to receive articles as they are discharged from said conveyor, the chutes being downwardly inclined and flared and forming guideways down which the articles are carried by gravity in divergent paths, belt conveyors comprising horizontally disposed parallel conveyor frames, and endless conveyor belts extending from the discharge ends of the chutes in position to receive the articles as they leave the chutes, rolls over which said belts are trained, upright supporting frame members fixed to the horizontal conveyor frames, means for oscillating said upright members about vertical axes at the delivery ends of said chutes and thereby oscillating said discharge conveyors and distributing the articles laterally as they are discharged from the conveyors.

2. The apparatus defined in claim 1, the means for oscillating the discharge conveyors comprising a drive shaft, a cam keyed to said shaft, a rock arm, a cam follower attached to the rock arm and running on said cam, a rock arm connected to one of said swinging frames, a rod connecting said rock arms, parallel rock arms connected to the said upright frame members, and a rod connecting said parallel rock arms.

3. Apparatus for conveying and distributing articles comprising a pick-up conveyor including a supporting frame and an endless conveyor chain mounted on said frame and comprising an upper lead and a lower lead, a stationary rail beneath and extending lengthwise of said lower lead, said rail being substantially parallel with and spaced below said lead, pick-up lugs carried by said chain and extending into the space between said lead and rail, means for driving the chain and thereby causing the lugs to travel along said space, means for delivering articles to said rail and lugs, said rail forming a support for the articles while they are advanced by said lugs to a discharge position, a pair of chutes at the discharge end of the said conveyor, said chutes having their upper ends adjacent to each other and in the path of the articles at the discharge end of said conveyor, the chutes being downwardly inclined in divergent directions and curved horizontal with their lower end portions substantially horizontal and parallel, discharge conveyors positioned to receive the articles from said chutes, said discharge conveyors being mounted for oscillating movement about vertical axes at the delivery ends of said chutes, and power means for oscillating the discharge conveyors about their said axes and thereby distributing the articles transversely as they are delivered from the conveyors, the oscillating movement of each of said discharge conveyors being through an angle such that the discharge end of the conveyor moves horizontally a distance approximately equal to the distance between said discharge ends.

References Cited in the file of this patent

UNITED STATES PATENTS

| | | |
|---|---|---|
| 347,038 | Hey | Aug. 10, 1886 |
| 683,039 | Hagen | Sept. 24, 1901 |
| 803,720 | Shunk | Nov. 7, 1905 |
| 1,044,428 | Wallace | Nov. 12, 1912 |
| 1,413,741 | France | Apr. 25, 1922 |
| 1,462,078 | Williams | July 17, 1923 |
| 1,476,634 | Neighbour | Dec. 4, 1923 |
| 1,667,714 | Bacheller | May 1, 1928 |
| 1,742,239 | Dotson | Jan. 7, 1930 |
| 1,774,047 | Wharton | Aug. 26, 1930 |
| 1,799,978 | Franklin | Apr. 7, 1931 |
| 2,167,676 | Pechy | Aug. 1, 1939 |
| 2,618,374 | Rahlson | Nov. 18, 1952 |
| 2,648,422 | Kling | Aug. 11, 1953 |

FOREIGN PATENTS

| | | |
|---|---|---|
| 1,013,700 | France | Aug. 1, 1952 |